United States Patent [19] …

[11] 4,210,130
[45] Jul. 1, 1980

Boodley et al.

[54] SOLAR COLLECTOR WITH MULTI-TURN COLLECTING STRIPS

[76] Inventors: Nancy K. Boodley, Townline-Iradell Rd.; Frank Hanshaw, Spruce La., both of Ithaca, N.Y. 14850

[21] Appl. No.: 871,064

[22] Filed: Jan. 20, 1978

Related U.S. Application Data

[63] Continuation of Ser. No. 760,230, Jan. 17, 1977, abandoned.

[51] Int. Cl.² ............................................... F24J 3/02
[52] U.S. Cl. ...................................... 126/449; 126/417
[58] Field of Search ............... 126/270, 271, 438, 439, 126/441, 449, 450, 436, 417; 237/1 A

[56] References Cited

U.S. PATENT DOCUMENTS

| 2,907,318 | 10/1959 | Awot | 126/270 |
|---|---|---|---|
| 2,998,005 | 8/1961 | Johnston | 126/270 |
| 3,194,222 | 7/1965 | Bargues | 126/271 |
| 3,220,671 | 11/1965 | Ashman et al. | 126/270 |
| 3,902,474 | 9/1975 | Pyle | 126/270 |
| 3,946,944 | 3/1976 | Keyes | 126/270 |
| 3,985,116 | 10/1976 | Kapany | 126/270 |
| 4,030,477 | 6/1977 | Smith | 126/270 |
| 4,043,318 | 8/1977 | Pei | 126/271 |
| 4,052,976 | 10/1977 | Hinterberger | 126/271 |
| 4,055,161 | 10/1977 | Jones | 126/271 |
| 4,067,316 | 1/1978 | Brin et al. | 126/270 |

Primary Examiner—James C. Yeung
Assistant Examiner—Larry Jones
Attorney, Agent, or Firm—Jones, Tullar & Cooper

[57] ABSTRACT

A solar collector generally of the plate type which utilizes a plurality of multi-turn collecting strips is disclosed. The multi-turn collecting strips are helixes of either cylindrical or conical shape and are positioned on the interior surfaces of the collector. These helical collecting strips absorb the sun's rays from the various angles at which the rays strike the collector during the day and concentrate and intensify the heat of the rays with this heat then being transferred to a suitable medium such as air for use in home heating or other applications.

3 Claims, 4 Drawing Figures

SOLAR COLLECTOR WITH MULTI-TURN COLLECTING STRIPS

CROSS REFERENCE TO RELATED APPLICATIONS

The present application is a continuation of our pending U.S. patent application, Ser. No. 760,230, filed Jan. 17, 1977 and entitled "Solenoidal Coil Solar Heat Collector", now abandoned.

FIELD OF THE INVENTION

The present invention is directed generally to a solar collector of the plate type. More particularly, the present invention is directed to a solar collector which utilizes multi-turn collecting strips as a collecting means. Most specifically, the present invention is directed to a solar collector utilizing multi-turn collecting strips of either conical or cylindrical helical shape.

The solar collector in accordance with the present invention is generally of the plate type and is structured generally as a rectangular box having an insulated back, sides, and a light transmissive cover such as double glass plates separated by an air space. The interior of the collector is provided with a plurality of multi-turn collecting strips in the shape of conical and/or cylindrical helixes. These helical collecting strips effectively absorb the light rays striking them and contain the reflected rays thereby utilizing a large portion of the light striking the collector so that a large amount of heat can be transferred to a suitable fluid such as air passing through the collector. This heated air is then utilized for any conventional purpose.

DESCRIPTION OF THE PRIOR ART

The use of plate type solar collectors is generally known in the prior art. These collectors are usually of a rectangular box shape having insulated sides and/or bottom with a light transmissive top. The interior of the box is colored or painted flat black and inlet and outlet means are provided for circulation of a transfer fluid such as air or a liquid.

The provision of heat collecting or conducting materials placed within the interior of the box is also known generally. For example, U.S. Pat. No. 3,102,532 to Shoemaker is directed to a solar collector which is an insulated box having a transparent cover, air flow passages, and metallic ribbon utilized as a collecting means. Similarly, U.S. Pat. No. 3,902,474 to Pyle is directed to a solar heat converter in the form of a box having a maze of air passages which are partially filled with shredded heat conductive material such as aluminum foil or wire. The heat conductive material is intended to increase the heat collecting ability of the solar collector thereby reducing the size and cost of the unit.

SUMMARY OF THE INVENTION

It is an object of the present invention to provide an improved solar collector.

Another object of the present invention is to provide a solar collector which utilizes multi-turn collecting strips in the collector.

A further object of the present invention is to provide a solar collector which utilizes helical multi-turn collecting strips.

As will be set forth in greater detail in the description of a preferred embodiment, the present invention is directed to a solar collector generally of the plate type and includes a box having an insulated back and sides with a transparent cover. A large number of helical collecting strips are positioned within the box and are of either cylindrical or conical shape.

As was discussed above, the general structure of a plate type solar collector is known in the art. Furthermore, the provision of various collecting means within the box is also known. As discussed above, these collecting means have taken a number of shapes such as wire mesh, metal ribbon and the like. In the present invention, however, the solar collector is provided with a large number of collecting means which are in the shape of multi-turn collecting strips. Specifically, these collecting strips are conical or cylindrical helixes. These helical collecting strips, which may be of metal or any other suitable material, are effective in collecting the sun's energy in the form of heat which may then be utilized as desired. It is believed that the cylindrical and conical helixes provide an infinite number of parabolic reflecting surfaces so that if any of the rays are not absorbed by the collecting strips, they are concentrated at the focal point of the parabola. Since the strips are of some length, the reflected rays are believed to form strips or spots of higher temperature areas. These areas of higher temperature are in contact with the transfer medium such as air as it passes through the solar collector thereby aiding in the heating of the transfer medium. The solar collector in accordance with the present invention is able to collect and transfer larger amounts of heat per surface area than are prior devices so that less space is required for the collector and less materials are needed for its construction. dr

BRIEF DESCRIPTION OF THE DRAWINGS

While the novel features of the present invention are set forth with particularity in the appended claims, a full and complete understanding of the solar collector in accordance with the present invention may be had by referring to the description of a preferred embodiment as set forth hereinafter and as may be seen in the accompanying drawings in which:

DESCRIPTION OF A PREFERRED EMBODIMENT

Figure 1:
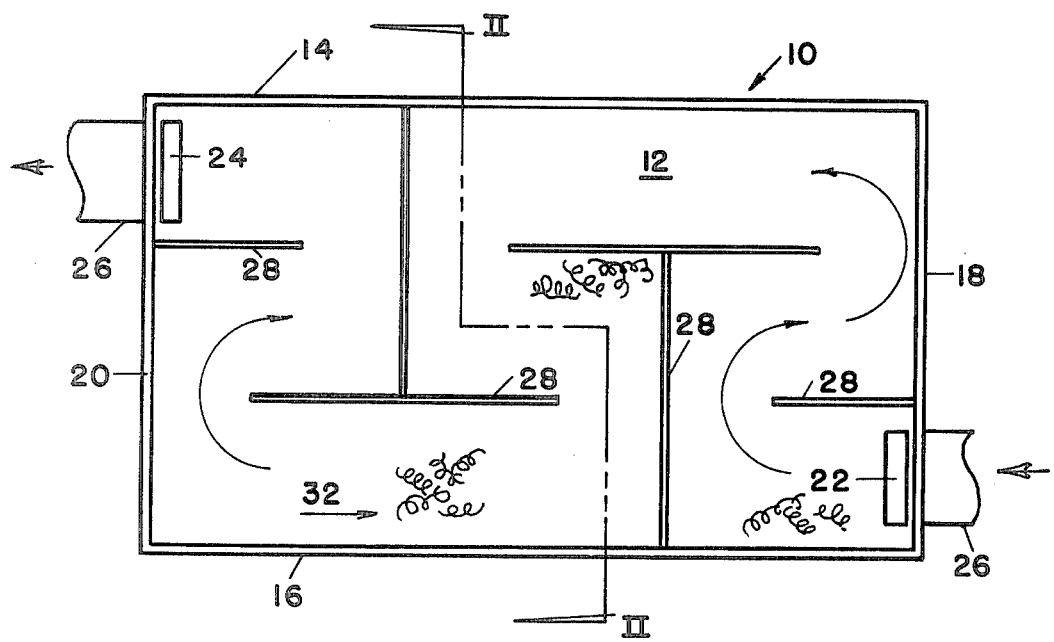
FIG. 1 is a top plan view of a preferred embodiment of a solar collector in accordance with the present invention.

Turning now to FIG. 1, there may be seen generally at 10 a preferred embodiment of a solar collector in accordance with the present invention. As was discussed previously, solar collector 10 is generally of the plate type and is a rectangular box having a base 12, upper and lower side walls 14 and 16, respectively, and inlet and outlet end walls 18 and 20, respectively. While solar collector 10 will hereinafter be discussed as being box shaped, it will be obvious that this shape is exemplary of any number of shapes which could be utilized as desired and as dictated by the intended location of the box.

As may also be seen in FIG. 1, solar collector 10 is provided with a suitable inlet 22 and an outlet 24 for the transfer fluid which may be either a gas or a liquid with, in the preferred embodiment, air being used. Inlet 22 and outlet 24 are joined to suitable ducts 26 which convey the heated air to its intended use. A plurality of flow directing baffles 28 are provided within the solar collector and extend between an interior surface of the base 12, and a light transmissive cover 30, as may be seen most clearly in FIG. 2, to define a flow path for the air to follow as it passes through the solar collector. The air receives heat from the sun which has been collected by the interior of the solar collector 10 and by a large number of multi-turn collecting strips, generally at 32, which are heated by the sun's rays passing through the cover 30 into the box.

Figure 2:
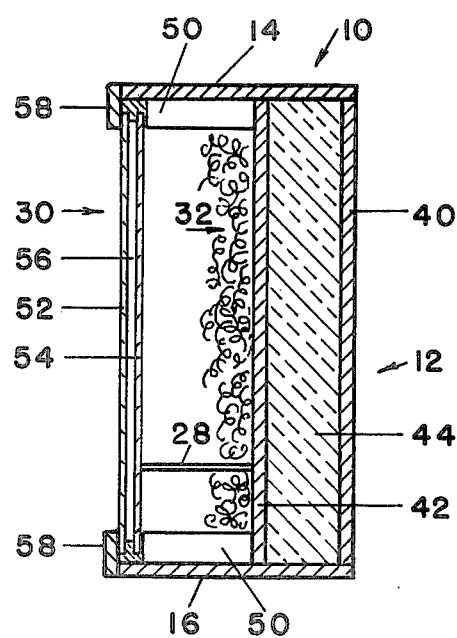
FIG. 2 is a sectional view of the solar collector of FIG. 1 taken along line II—II in FIG. 1.

As may be seen most clearly in FIG. 2, the base 12 of the solar collector 10 is comprised of a frame sheet 40 of suitable material such as wood, plywood, fiberglass, plastic, metal or the like, a backing sheet 42 which is similar in shape and material to frame sheet 40 and which provides the inner surface of the base, and a layer of insulation 44 sandwiched between the two sheets 40 and 42. The insulation can be of any desired type and, in the preferred embodiment, is 4 inch thick polyurethane with an "R" factor of 6.25/inch of thickness at 50° F. Any suitable insulation can be used in base 12. The side and end walls 14, 16, 18 and 20 are also of any suitable sheet material, such as $\frac{3}{4}$ inch plywood, so long as the material used is compatible with its intended use. Suitable reinforcing blocks 50 may be provided to add rigidity to the solar collector 10 and also to provide support for the cover 30. Cover 30, as may be seen in FIG. 2, is comprised of spaced glass sheets 52 and 54 separated by an air space 56. Any light transmissive materials can be used for cover 30 with glass being preferred. Suitable cover frame means 58 are provided to hold the cover in place.

The interior of the base and sides of the solar collector 10 are lined with formed and sealed thin metal sheets such as copper or aluminum of a thickness of 0.010 to 0.032 inches, and the several partitions 28 are structured of the same material. The multi-turn collecting strips 32 are secured to the interior surface of the base portion of the solar collector by any suitable means to a depth of approximately 2 inches. All the interior portions of the solar collector 10, with the exception of the cover 30, are painted with a flat black paint, or the like, so that they will absorb as much of the sun's rays as possible and reflect as little away as possible.

Figure 3:
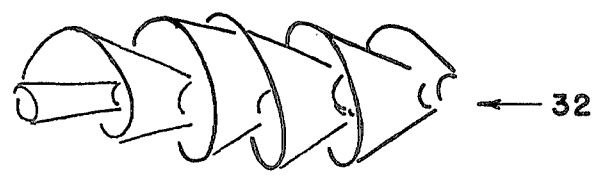
FIG. 3 is a perspective view of a conical helical multi-turn collecting strip in accordance with the present invention.
Figure 4:
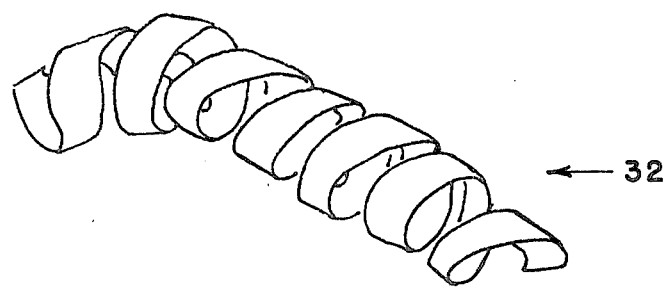
FIG. 4 is a perspective view of a cylindrical helical multi-turn collecting strip in accordance with the present invention.

The multi-turn collecting strips 32 which are secured to the interior of the base 12 of the solar collector 10 may be seen most clearly in FIGS. 3 and 4. In FIG. 3 there is shown a collecting strip in the shape of a conical helix and in FIG. 4 there is shown a collecting strip shaped as a cylindrical helix. In the preferred embodiment, these helical collecting strips are either aluminum or copper metal having a preferred thickness of 0.016 inch. The range of sizes of the strips is from 2 to 12 inches in length with 6 to 8 inches preferred; from $\frac{1}{4}$ to 2 inches in diameter with $\frac{3}{4}$ to 1 inch preferred; and from $\frac{1}{4}$ to $\frac{3}{4}$ inch strip width with $\frac{1}{2}$ inch preferred. As was discussed above, these helical collecting strips are secured by any suitable means to the entire interior base portion of the collector and are painted or otherwise coated to be as absorbent of the radiant solar energy passing through the cover 30 as possible.

The radiant solar energy which passes through cover 30 into the interior of the collector is short wave radiation. The black coated aluminum or copper helical collecting strips absorb most of this radiation or reflect it from one helical strip to another. Each of the multi-turn strips provides an infinite member of parabolic sections each of which reflects those rays not absorbed. Since a parabola concentrates reflected rays at its focal point and further since each of the strips is elongated in length, the reflected rays tend to form bands or strips of areas of elevated temperature. Further, since the multi-turn helixes are randomly placed within the collector, they always present some faces to the sun regardless of the sun's position. The heat energy which is re-radiated is longwave radiation and this does not pass through the glass cover 30. Therefore, as radiation strikes the collector, it is absorbed or trapped as heat energy which can then be removed by the transfer fluid such as air passing through the interior of the collector.

The air which passes through the collector may be forced therethrough by a suitable fan or the like such as is provided in a conventional home forced hot air heating system. As the air passes through the interior of the collector and is guided in a flow path by the several baffles 28, it picks up the heat collected by the interior of the collector and by the helical collecting strips. The air which has been heated at the focal points of the parabolas defined by the helical strips is forced out of the collector and the flow of air through the helical strips creates turbulence which also aids in effective heat transfer from the strips and collector interior to the transfer fluid. It will be obvious that the system must be a sealed system for efficient operation and that the size of the collector, the fan size, and the volume of air to be moved will all depend on the amount of heat required for a particular application and the mean daily solar radiation in a particular geographical location.

The multi-turn metal helical collecting strips can be manufactured from a waste product, if desired, to reduce material costs. The helical strips are stable and are not easily damaged in transportation or installation and do not require any special forming processes such as extrusion, expansion, or the like. The collecting strips may be secured in the collector in a random array, if desired, thus reducing assembly costs and also insuring that at least some of the parabolic surfaces will receive the sun's rays at any time. The collector can, accordingly, be placed at an angle to the sun which will be most advantageous over the entire season depending upon the latitude of installation. This eliminates the need for the use of a heliostat or the like to cause the collector to move and follow the sun during the day. Thus, the use of helical multi-turn metal collecting strips in a plate type solar collector provides a collection device which is highly effective in collecting heat from the sun, which does not require expensive or difficultly produced components, which can be mounted in one position and does not require repositioning as the sun moves and which provides a higher amount of heat per unit of surface area than presently available solar collectors due to the enhanced collection provided by the helical multi-turn metal collecting strips.

While a preferred embodiment of a solar collector with multi-turn collecting strips has been fully and completely set forth hereinabove, it will be obvious to one of ordinary skill in the art that numerous changes in, for example, the shape of the collector box, the type of materials used in its construction, the transfer medium for the heat collector, the size of the helical collecting strips, the placement of the flow control baffles, and the like could be made without departing from the true spirit and scope of the invention, and accordingly the invention is to be limited only by the following claims.

We claim:

1. A solar collector for collecting energy from the sun and transferring the energy to a transfer fluid, said solar collector comprising:

a collecting box, said box having inlet and outlet means for said transfer fluid and including an insulated bottom, side walls extending upwardly from said bottom, and a light transmissive cover, said bottom, sides and cover defining an air tight space, inner surfaces of said bottom and side walls being collecting surfaces;

a plurality of multi-turn helical collecting strips secured to said inner surface of said bottom of said collecting box, each of said helical collecting strips having a strip width of between about $\frac{1}{4}$ and $\frac{3}{4}$ inch and a strip length of between about 2 and 12 inches and forming an infinite number of parabolic surfaces, each of said parabolic surfaces absorbing a portion of the rays from the sun striking it, rays reflected from said parabolic surfaces being collected and concentrated at the focal length of said parabolic surfaces to form areas of elevated temperature; and means for causing flow of said transfer fluid through said collecting box whereby heat collected in said box by said inner surfaces of said walls and bottom, said multi-turn collecting strips, and concentrated at the focal length of said parabolic surfaces is transferred to said transfer fluid and is removed from said solar collector.

2. The solar collector of claim 1 wherein said helical strips are conical.

3. The solar collector of claim 1 wherein said helical strips are cylindrical.

* * * * *